(12) United States Patent
Pollard et al.

(10) Patent No.: US 11,704,977 B2
(45) Date of Patent: *Jul. 18, 2023

(54) METHOD AND APPARATUS FOR DISPENSING FUNDS IN A LOTTERY

(71) Applicant: Pollard Banknote Limited, Winnipeg (CA)

(72) Inventors: Douglas E. Pollard, Winnipeg (CA); Nancy Bettcher, Winnipeg (CA); Richard Bennett Roschuk, Winnipeg (CA); Amit Chhabra, Winnipeg (CA)

(*) Notice: Subject to any disclaimer, the term of this patent is extended or adjusted under 35 U.S.C. 154(b) by 305 days.

This patent is subject to a terminal disclaimer.

(21) Appl. No.: 16/722,460

(22) Filed: Dec. 20, 2019

(65) Prior Publication Data

US 2020/0143628 A1 May 7, 2020

Related U.S. Application Data

(63) Continuation of application No. 16/126,755, filed on Sep. 10, 2018, now Pat. No. 10,657,773.

(60) Provisional application No. 62/556,871, filed on Sep. 11, 2017.

(51) Int. Cl.
| | |
|---|---|
| *A63F 9/24* | (2006.01) |
| *G07F 17/32* | (2006.01) |
| *G06K 7/14* | (2006.01) |
| *G06K 19/06* | (2006.01) |

(52) U.S. Cl.
CPC ......... *G07F 17/329* (2013.01); *G06K 7/1417* (2013.01); *G06K 19/06037* (2013.01)

(58) Field of Classification Search
CPC .................................................. G07F 17/329
See application file for complete search history.

(56) References Cited

U.S. PATENT DOCUMENTS

| | | | | |
|---|---|---|---|---|
| 9,251,663 | B1* | 2/2016 | Sandvick | G07F 17/3258 |
| 2002/0090986 | A1* | 7/2002 | Cote | G07F 17/3248 |
| | | | | 463/16 |
| 2006/0258433 | A1* | 11/2006 | Finocchio | G07F 17/32 |
| | | | | 463/16 |
| 2020/0043278 | A1* | 2/2020 | Gotlieb | G07F 17/42 |

* cited by examiner

*Primary Examiner* — Lawrence S Galka
(74) *Attorney, Agent, or Firm* — Adrian D. Battison; Ade & Company Inc.; Ryan W. Dupuis

(57) ABSTRACT

A lottery apparatus includes a programmed computer acting as a lottery control system which controls operation of the distribution of prizes to the purchasing customers from a lottery pool. The apparatus includes a plurality of typical instant win lottery tickets having a predetermined prize result taken from the pool together with a plurality of lottery cards which do not act as lottery tickets but instead include an activation code containing no information defining a prize and an access code which is used for entry by the customer into a digital experience provided by the lottery control system by which the customer accesses game information. The system, when the code is activated, assigns the result from the pool to the code and displays to the customer on a digital experience when accessed by the access code.

18 Claims, 2 Drawing Sheets

METHOD AND APPARATUS FOR DISPENSING FUNDS IN A LOTTERY

This application is a continuation of application Ser. No. 16/126,755 filed Sep. 10, 2018.

This invention claims the benefit under 35 USC 119(e) of Provisional application 62/556,871 filed Sep. 11, 2017.

This invention relates to a method and apparatus for operating a lottery or for dispensing funds in a lottery to customers of the lottery which can also be expressed as an apparatus for managing a lottery distribution.

BACKGROUND OF THE INVENTION

Lottery tickets are well known and widely sold and typically comprised of a sheet material of paper or card stock on which is printed lottery information and various indicia for the playing of one or more games. Many such games are instant win type games where the customer can play the game or games by carrying out various functions, for example, opening pull tabs on a break-open ticket.

It is well known that the lottery tickets are managed by a control system typically managed by the ticket producer and the lottery to ensure that the tickets have allocated a predetermined outcome of winners, prizes and non-winners to dispense to the customers a predetermined proportion of the income obtained from the sale of the tickets.

In some cases a second chance game is also available which is played on-line by the customer using a QR code, chat bot, or any other mechanism to provide a URL to a customer to access a digital experience. This is typically a separate lottery from the primary lottery and is used as merely a fun game with no prize value or uses different funds to finance the second game.

SUMMARY OF THE INVENTION

According to the invention there is provided a method for managing a lottery distribution of lottery funds to customers in a lottery comprising:

a lottery control system comprising at least one programmed computer;

providing a plurality of lottery cards each comprising a substrate and each having printed thereon:
  a Point of Sale (POS) code by which the lottery card is scanned through a POS system for purchase of the lottery card by a customer of the customers;
  a unique activation code which is scanned for entry of data identifying the lottery card into the lottery control system;
  and an access code which is used for entry by the customer into a digital experience provided by the lottery control system on a communication platform accessible by an internet communication device operated by the customer;

the lottery control system containing a pool of lottery outcomes containing both winners of a predetermined prize and non-winners of the lottery;

the lottery control system and the lottery cards being arranged such that, prior to receipt of the activation code from a lottery card by the lottery control system, the lottery card is not associated in the lottery control system with any of the outcomes in the pool of outcomes;

reading the POS code and the activation code of a lottery card at a POS terminal;

completing a purchase transaction of the lottery card using the POS code at the POS terminal;

transmitting the activation code from the POS terminal to the lottery control system without communication of the activation code through a lottery terminal;

in response to the receipt of the activation code by the lottery control system, selecting from the pool one of the lottery outcomes as a selected outcome and associating the activation code with the selected outcome;

the lottery control system operating to display to the customer on said digital experience said selected outcome as a digital experience game mechanic.

Preferably the display of the selected outcome on the digital experience game mechanic is provided by the lottery control system independent of any game symbols provided on the lottery card.

Preferably the lottery control system includes, with the digital experience game mechanic, a validation code which is arranged to be stored on the internet communication device of the customer; and wherein the validation of the prize determined by the selected outcome is carried out by displaying the validation code on the internet communication device to a lottery terminal or by printing for display.

Also there is disclosed herein an apparatus for managing a lottery distribution or for dispensing funds to customers in a lottery comprising:

a lottery control system comprising a programmed computer;

a plurality of lottery tickets each comprising a substrate, game symbols printed on the substrate and one or more removable coverings over the game symbols which are removable by a customer to reveal the symbols;

each lottery ticket being associated in the lottery control system with a predetermined result of the lottery by which the lottery ticket is either a winner of a predetermined prize or a non-winner of the lottery as identified to the customer by revealing the symbols;

a plurality of lottery cards each comprising a substrate;

each of the lottery cards having printed thereon a Point of Sale (POS) code by which the lottery card is scanned through a POS system for purchase of the lottery card by a customer;

each of the lottery cards having printed thereon a unique activation code which is scanned for entry of data identifying the lottery card into the lottery control system;

the activation code containing no information which identifies the lottery card as either a winner of a predetermined prize or a non-winner of the lottery;

each of the lottery cards having printed thereon an access code which is used for entry by the customer into a digital experience provided by the lottery control system by which the customer accesses game information;

each of the lottery cards having thereon no game symbols which identify the lottery card as either a winner of a predetermined prize or a non-winner of the lottery to the customer;

the lottery control system operating to receive the activation code and to provide in response a validation code which contains information defining a result which identifies the lottery card as either a winner of a predetermined prize or a non-winner of the lottery;

the lottery control system operating, in response to the receipt of the activation code, to provide in said validation code said information which identifies the result by assigning said result from a pool containing a plurality of options for results stored in said lottery control system;

the lottery control system operating to display to said customer on said digital experience the assigned validation code lottery ticket information defining said result as to whether the outcome assigned to the lottery card is either a winner of a predetermined prize or a non-winner of the lottery.

The term "digital experience" used herein can be provided by a web site or other methods of digital presentation (web site, mobile app, desktop app, chatbot, etc).

The validation code can be specifically assigned code independent of other information or the term can use other data such as the game/book/ticket. Thus the term is intended to include any material which defines predetermined outcome data and does not require a particular format.

The activation code which is scanned for entry of data identifying the lottery card into the lottery control system may be a separate code independent of the POS code but also in some cases the activation code can instead be possibly contained within the POS Code and thus scanned simultaneously.

The assignment of the results from the pool can be done by random selection, but this could potentially change per lottery. Some may not accept random selection, and may require sequential assignment, for example. Thus the mode of selection or assignment can be varied depending on the requirements of the lottery to whom the apparatus is supplied. In some cases, where the cards are printed and supplied as a "book" of the cards, the results may be assigned to a particular book of the cards and then selected at random for that book as the cards of the book are activated.

Alternatively the same invention can be expressed as a method for dispensing funds to customers in a lottery comprising:

managing the lottery using a lottery control system comprising a programmed computer;

supplying a plurality of lottery tickets each comprising a substrate, game symbols printed on the substrate and one or more removable coverings over the game symbols which are removable by a customer to reveal the symbols;

each lottery ticket being associated in the lottery control system with a predetermined result of the lottery by which the lottery ticket is either a winner of a predetermined prize or a non-winner of the lottery as identified to the customer by revealing the symbols;

supplying a plurality of lottery cards each comprising a substrate;

scanning a Point of Sale (POS) code printed on each of the lottery cards for purchase of the lottery card by a customer;

scanning a unique activation code printed each of the lottery cards for entry of data identifying the lottery card into the lottery control system;

the activation code containing no information which identifies the lottery card as either a winner of a predetermined prize or a non-winner of the lottery;

providing by the lottery control system a digital experience by which the customer accesses game information;

providing access to the digital experience by an access code printed onto each of the lottery cards;

each of the lottery cards having thereon no game symbols which identify the lottery card as either a winner of a predetermined prize or a non-winner of the lottery to the customer;

the lottery control system operating to receive the activation code and to provide in response a validation code which contains information defining a result which identifies the lottery card as either a winner of a predetermined prize or a non-winner of the lottery;

the lottery control system operating, in response to the receipt of the activation code, to provide in said validation code said information which identifies the result by assigning said result from a pool containing a plurality of options for results stored in said lottery control system;

the lottery control system operating to display to said customer on said digital experience in response to receipt of said validation code lottery ticket information defining said result as to whether the lottery card is either a winner of a predetermined prize or a non-winner of the lottery.

Thus the lottery control system is arranged to allocate to the lottery a plurality of predetermined options for results, some of which are provided on the lottery tickets as predetermined results printed on the tickets and some of which are provided to the pool for the digital presentation.

Typically the access code and digital experience URI (uniform resource identifier) may be presented as a printed QR code scanned for example by a smart phone, but it can also be entered manually.

Preferably the lottery cards are entered into inventory for payment by a retailer to the lottery only when the activation code is scanned.

Preferably the lottery tickets are entered into inventory for payment by a retailer to the lottery when the lottery ticket is supplied to the retailer.

Typically the displayed information on the digital experience comprises game symbols. These may mimic the game symbols on the lottery tickets played by scratching or may form a different game type.

In addition there may be provided a reveal/skip button displayed on the digital experience which allows the customer to determine the information without reviewing the game symbols. In some cases, the digital reveal process on the web site or other reveal location can be bypassed by the purchaser by having the POS terminal directly print out the reveal bar code which the customer can then present for validation by the validation terminal without the customer even finding out the prize result. Of course the customer is then informed by the validation terminal whether the result allocated from the pool is a win, the prize associated with the win or whether it is a losing result.

In some cases the lottery control system can display on the digital experience game symbols unconnected to the lottery for fun play by the customer only in response to the access code when the activation code has not been scanned because the customer chose to not activate the card. That is the lottery card when obtained by a customer can be played on the digital experience but only becomes an active part of the lottery and the dispensing of the fund of the lottery only when the activation code has been scanned, is validated by the lottery security systems and is used to provide the validation code which allows the lottery to be played by the customer. The lottery cards thus have no value in the lottery until purchased and activated.

In some cases the lottery cards can be simple printed items with no actual game on the card or the lottery cards can printed with game symbols unconnected to the lottery for fun play only.

In some cases the lottery control system provides a second-chance draw or game at the end of the digital experience reveal.

The lottery control system can comprise a single networked computer, or a series of interconnected computers having access to the communications network via a gateway or other known networking system. The lottery control system can be a single system and in some cases includes a first lottery control component managed by the lottery and a second lottery control component managed by a supplier of the lottery tickets and the lottery cards in view of the different responsibilities involved in the management of the dispensing of the funds and the security, financial and licensing requirements involved.

The type of retail establishment may vary widely. For example, in certain embodiments, the retail establishments may be convenience stores, gas stations, pubs, and any other establishment that typically sells lottery tickets to the public. The present methodology and related system have particular usefulness for much larger retail establishments, such as multi-lane and "big-box" retail stores that are part of a national or other geographic chain, wherein the sale of lottery ticket sales has generally not been implemented due to the barrier of security and staffing requirements to manage and track activated and non-activated inventory of traditional instant lottery tickets.

A "lottery jurisdiction" is understood to be a geographic area, such as a state, territory, or the like, governed by a governmental authority. A typical example of a lottery jurisdiction is an individual state-sponsored lottery, such as the Georgia (USA) or Connecticut (USA) state lotteries. A lottery jurisdiction may also encompass multiple states or territories that participate in a national-scale lottery game, such as the PowerBall (Registered Trademark) and Mega Millions (Registered Trademark) games in the United States.

A "lottery authority" is understood to be the governmental body, agency, or other organization that governs play of lottery games in a particular jurisdiction. For example, the Connecticut Lottery Corporation is the lottery authority for play of lottery games in Connecticut. A lottery authority may also be an organization that governs play of multi-state games (games across multiple jurisdictions). An example of such an organization is MUSL (Multi-State Lottery Association) in the United States that administers the PowerBall (Registered Trademark) games for its member states.

A "host lottery system" is understood to be the system and associated entity that implements the logistical aspects of the lottery game for the lottery authority, such as printing and supplying tickets, providing server and computer services required to manage the various games, providing redemption services, and so forth. The host lottery system may be a system of the lottery authority, or may be implemented by a third party provider. An example of a host lottery system and associated entity is the system and services provided by Scientific Games International, Inc., of Alpharetta, Ga., USA.

In certain embodiments, the present method includes formatting the lottery tickets for sale at the retail establishment with a ticket purchase code and a separate ticket data code. These codes may be in the format of a machine readable bar code. The ticket purchase code mimics a UPC (Universal Product Code) or other type of code format used by the retail establishment for purchase of non-lottery products, and conveys sufficient information for processing the sale of the lottery ticket via the retail establishment's POS (Point-of-Sale) system. Thus, for each sale of a lottery ticket at the retail establishment, the ticket purchase code is input into the POS system of the retail establishment (e.g., by scanning the code) such that purchase of the lottery ticket mimics purchase of a non-lottery product in the POS system. In the POS system, the purchase code is linked to a database file wherein information necessary (e.g., price, discounts, etc.) for the purchase transaction is retrieved and processed. As with any product sold in the retail establishment, this database can be continuously updated with new lottery products, pricing, promotions, and the like.

The arrangement herein thus provides a dual-stream game where a subset of the game printed in the conventional scratch ticket process, with conventional, book-level activation and billing process, and another subset of the game used for a digital game experience, with different, single ticket-level activation and billing process. The tickets are subject to the conventional security systems well known and established for such tickets. The cards do not need the security systems because they have no value until activated so that the security aspects can be provided in the computer management system rather than at the physical ticket level.

The subset of plays related to the digital game experience are delivered as printed promotional pieces that are inert until activated. Then it becomes a digital play experience with a predetermined outcome that is assigned only at the time of activation.

Customer Experience

A customer at for example a big-box retailer sees the product as a game card on a shelf near checkout or an aisle end cap, and makes an impulse purchase.

Using the store's existing POS system, the retail employee scans the product's retail code (UPC, EAN, Code-128, etc), is prompted to perform age verification, and optionally scan the activation barcode on the back of the game card if the retail code does not include the activation code. The retail staff member can then continue ringing through other products in the Consumer's cart The activation or outcome assignment request is not sent until payment is confirmed.

The activation code and retailer data is contained in the activation or outcome assignment payload. The lottery control system, and typically that part managed by the supplier rather than the lottery, returns the assigned outcome from the pre-determined validation file.

The lottery control system, and typically that part managed by the Lottery retail system, is optionally sent a request to activate the assigned outcome from validation file as in the regular book or single-ticket activation process.

The digital experience can now be used by the customer to access the pre-determined outcome. The consumer uses their smartphone, or other device, to access a URI via a scan of the product's QR code, send a message to an SMS chat bot, or any other mechanism to ultimately provide a URL to a consumer. The smartphone launches a digital experience, for example a responsive web app in the device's default web browser via the URL in a QR code. If the activation code is confirmed to be active, the digital game begins and reveals the result to the customer. If the activation code is inactive, that is not yet activated by the above process, the consumer has an opportunity to play for fun, treating the inert product as a sampling promotion. The customer plays the game, or taps the "Reveal/Skip" button to determine if they are a winner. Non-winners can be encouraged to play again, or sign-in to collect loyalty points and for a chance at a Retailer-oriented second-chance draw as discussed below in the section for the Retailer experience for details.

Winners are also encouraged to sign-in to collect Lottery loyalty points, and are asked if they would like to have their validation code emailed to them, or add it to Apple/Google wallet as a digital pass Digital passes can have lottery retailer longitude/latitude coordinates attached to trigger a home screen notification presenting the digital pass containing the validation barcode when they are near a lottery retailer.

The customer visits lottery validation terminal/kiosk in a full-service lottery retailer, or a validation terminal in a big box store, if this exists, to collect minor prizes and presents digital barcode or printed PDF validation barcode.

Major prizes require a visit to the Lottery head office, in a process similar to instant ticket processes today.

Lottery Experience

The lottery can select any existing instant ticket game to have a portion of the prizes allocated into the pool for the separate digital play, maintaining the top-prize and prize structure of the larger traditional instant game with the in-lane, digital-reveal game.

The lottery cards can be designed to match/mimic the instant ticket counterpart using many of the same print options and innovations which are available. The lottery can order a desired amount of lottery cards on a first run of the game, and can re-order at any time. The lottery can disseminate the lottery cards to any retailer that has been set-up by the lottery control system.

The lottery has access to a web portal providing real-time reporting on which retailers, retail locations, which games, and qualities have been activated/sold within a configurable time period. This enables the Lottery to define any billing model they desire with their retail partner. The lottery can have access to a web portal providing the ability to reconstruct a damaged lottery card, whether it has been activated, and what the pre-determined outcome assigned at activation is. The lotteries may work with a retailer to include a second-chance draw or game at the end of the digital experience reveal. The second-chance draws can be for retailer gift-cards, merchandise or other prizes, can be branded exclusively for the retailer, completes the circle, bringing the consumer back to the retailer's brand and can be a valuable digital customer acquisition tool for iLottery, Loyalty, or Customer Club programs.

Retailer Experience

The retailer works with the lottery control system to configure their Point-of-Sale (POS) system to facilitate activation when lottery card UPCs/EANs are scanned through a till. This business process is nearly identical to the existing gift card activation process which retail staff is already familiar with. The retailer is not required to manage inventory of the lottery cards, but should notify the Lottery when they require additional stock.

The lottery cards are essentially inert advertising pieces unless they have a pre-determined outcome assigned to them by the lottery control system via activation through a retail purchase.

The retailer is billed using the Lottery's defined and agreed billing process for lottery cards that are activated/sold through their POS system.

The retailer may work with a lottery to include a second-chance draw or game at the end of the digital experience reveal.

The lottery cards therefore contain the following information:

A UPC/EAN/Code-128 product code used by the retail POS system to identify the product in inventory and trigger product-specific point-of-sale actions;

A unique identifying code used to identify each instance of the card which is not associated to any instant ticket game outcome code or game data code, and is only used to uniquely identify an instance of the printed product. This is printed on the back of the card in the form of a long (for example, Code-128) barcode, similar to that of a gift card and printed on the front of the card in a human-readable format (for example, an alpha-numeric code ranging from 5 to 32 digits);

A URL used to launch the digital experience associated to the specific game which may be presented in plain-text as a short URL or may be presented as a QR Code, with the "Activation code" pre-appended to the URL in the QR Code image, or may be presented via a Chat Bot, accessible via a standard cellular SMS (simple message service) phone number chosen by the lottery.

The arrangement herein specifically does not print a "ticket data code" on the card because the "ticket data code" is directly related to a game outcome. If the card contained a "ticket data code" when printed, it would inherently have a winning or non-winning outcome assigned to the printed product. In the event of loss/damage/theft of the printed product, this would result in the prize pool being diluted and potential winning/non-winning outcomes being lost or destroyed, potentially including the game's grand prize.

One key point in this product, is that the predetermined game outcome is only assigned to the card and available to the customer once a purchase has been made, not when the card is printed. The predetermined game outcome is assigned in the following way:

The Retail POS system transmits the "Activation" code and retailer data payload to the lottery control System;

The "activation" code is scrubbed through a number of security measures to ensure it is valid;

Predetermined outcome data (validation code and/or game/book/ticket number) from the reserved pool is assigned to the transmitted "activation" code;

The lottery control System returns the validation code to the Retail POS System;

Optionally, the Retail POS system transmits the predetermined outcome data to the Lottery Host component of the lottery control system to be made active for redemption;

Optionally, the Lottery Host component returns a response to the Retail POS System confirming successful activation of that predetermined outcome data.

BRIEF DESCRIPTION OF THE DRAWINGS

One embodiment of the invention will now be described in conjunction with the accompanying drawings in which.

DETAILED DESCRIPTION

Figure 1:
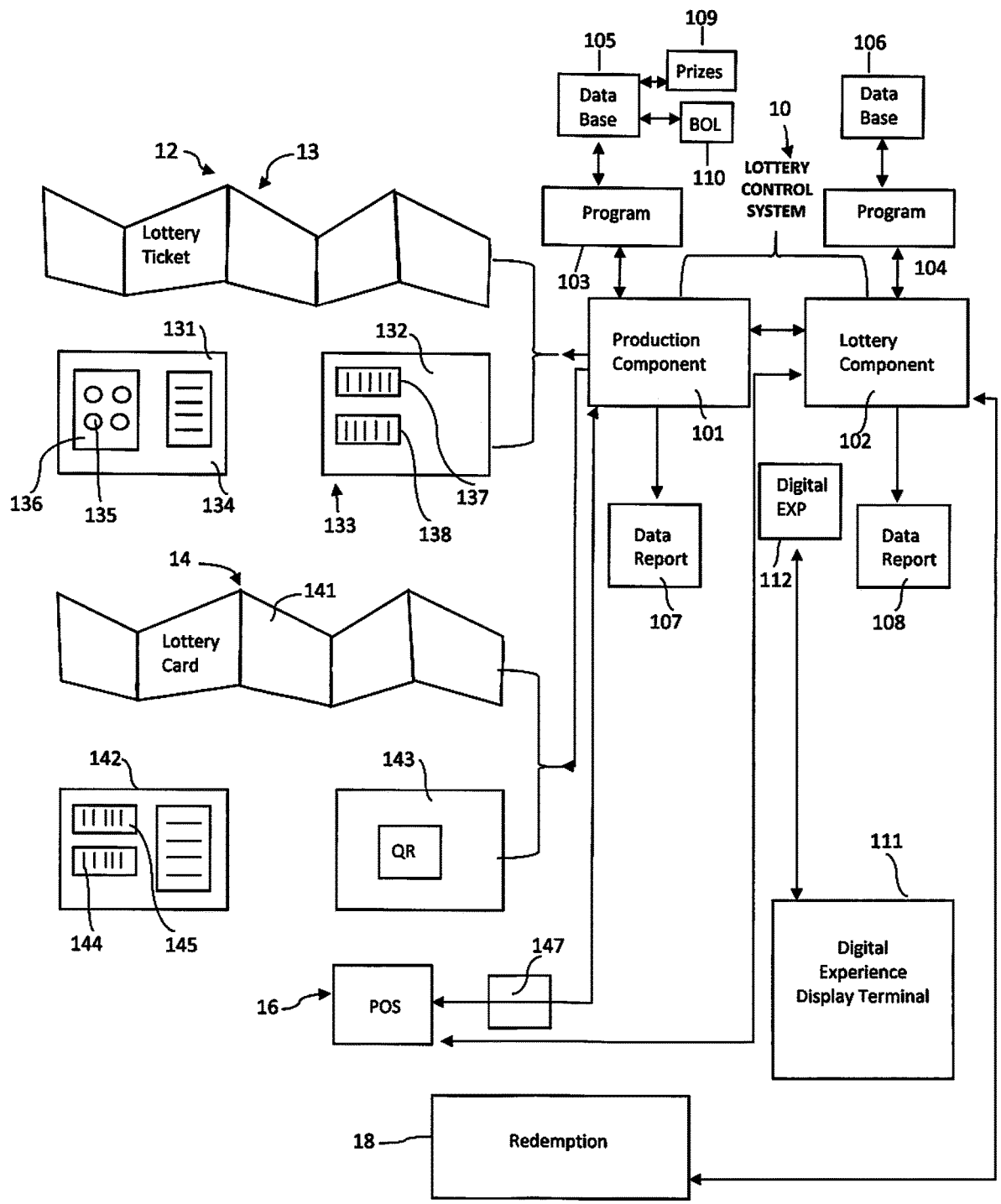
FIG. 1 is a schematic illustration of an apparatus according to the present invention for controlling the operation of a lottery and the dispensing of funds to customers of the lottery.

The apparatus for dispensing funds to customers in a lottery shown in FIG. 1 includes a lottery control system 10, a plurality of lottery tickets 12, a plurality of lottery cards 14, a POS terminal 16 and a lottery redemption terminal 18.

The lottery control system includes a production control component 101 and a lottery management control component 102. These operate together and share required information to carry out the functions defined herein. These use programing 103 and 104 and data bases or memories 105, 106. These can be operated to generate data reports 107 and 108 all as described herein.

The data base 105 of the production component is arranged to generate for a lottery a set of outcomes which winning prizes of different values and non-winners. These are divided by the established programing into a prize set 109 to be used for the lottery tickets and into a pool 110 to be used for the lottery cards as described hereinbefore.

The plurality of lottery tickets 12 includes a printed set of tickets 13 where each ticket 133 is printed on a substrate 134 and has a front surface 131 and a rear surface 132. On the front surface of the substrate is provided a conventional game ticket including game symbols 135 printed on the substrate and one or more removable coverings 136 over the game symbols which are removable by a customer to reveal the symbols. On the rear surface is provided a first code 137 for the POS terminal and a second code 138 for the activation system.

Each lottery ticket is printed by the production control component and is associated in the lottery control system with a predetermined result of the lottery by which the lottery ticket is either a winner of a predetermined prize or a non-winner of the lottery as identified to the customer by revealing the symbols.

The plurality of lottery cards 14 each comprise a substrate 141 with a front face 142 and a rear face 143. Each of the lottery cards has printed thereon a Point of Sale (POS) code 144 by which the lottery card is scanned through a POS system for purchase of the lottery card by a customer. Each of the lottery cards has printed thereon a unique activation code 145 which is scanned for entry of data identifying the lottery card into the lottery control system.

The activation code is arranged by the control system so that it contains no information which identifies the lottery card as either a winner of a predetermined prize or a non-winner of the lottery.

Each of the lottery cards has printed on a surface a method to access a URL, for example a QR code, which is used for entry by the customer into a digital experience 112 provided by the lottery control system by which the customer accesses game information. The customer uses a terminal 111 typically a smart phone to access the digital experience 112 generated by the control system.

Each of the lottery cards has on either surface no game symbols which identify the lottery card as either a winner of a predetermined prize or a non-winner of the lottery to the customer. It may contain a fun game as a separate matter unconnected with the lottery.

The lottery control system 10 operates to receive the activation code 145 and to provide in response a validation code transmitted to the POS terminal as indicated at 147 which contains information defining a result which identifies the lottery card as either a winner of a predetermined prize or a non-winner of the lottery. This result is obtained by assigning the result from the remaining pool 110 containing the plurality of options for results separated from the total prize allocation previously determined.

The lottery control system 10 operates to display to the customer on the display 111 the information from the digital experience 112. In response to receipt of the validation code entered by the customer from the information provided by the POS terminal, the web sire 112 displays to the customer at the terminal 111 lottery ticket information, typically in the form of game symbols, defining the result as to whether the lottery card is either a winner of a predetermined prize or a non-winner of the lottery.

The system 10 may be a single networked computer, or a series of interconnected computers having access to the communications network via a gateway or other known networking system. Generally, the system 10 is configured to communicate with, manage, execute and control individual lottery terminal units 101, 102 within the lottery jurisdiction. The system 10 may include a memory 105, 106 for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 10.

Figure 2:
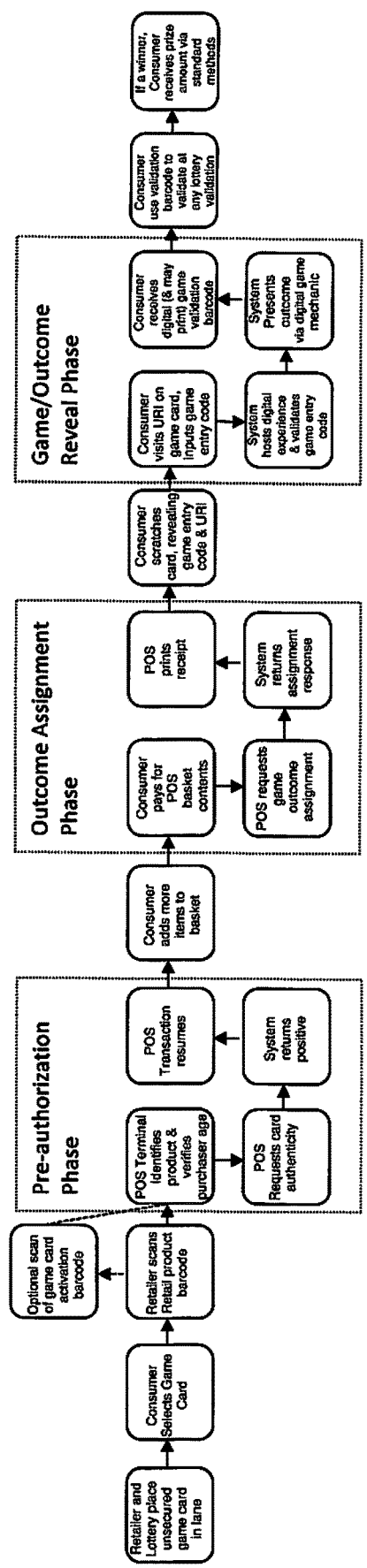
FIG. 2 is a flow chart showing the steps described hereinafter.

FIG. 2 is a flow chart showing the steps described above.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for managing a lottery distribution of lottery funds to customers in a lottery comprising:

provinding a lottery control system comprising at least one programmed computer;

providing a plurality of lottery cards each comprising a substrate and each having printed thereon:

a Point of Sale (POS) code by which the lottery card is scanned through a POS system for purchase of the lottery card by a customer of the customers;

a unique activation code which is scanned for entry of data identifying the lottery card into the lottery control system;

and an access code which is used for entry by the customer into a digital experience provided by the lottery control system on a communication platform accessible by an internet communication device operated by the customer;

providing in the lottery control system a predetermined pool of instant win lottery outcomes containing both winners of a predetermined prize and non-winners of the lottery;

the lottery control system being arranged to receive the unique activation code of a lottery card when transmitted from a POS terminal to the lottery control system after reading of the POS code and the activation code of the lottery card by the POS terminal and after completing a purchase transaction of the lottery card using the POS code at the POS terminal;

the lottery control system and the lottery cards being arranged such that, prior to receipt of the activation code from a lottery card by the lottery control system, the lottery card is not associated in the lottery control system with any of the outcomes in the pool of outcomes;

in response to the receipt of the activation code by the lottery control system, selecting from the predetermined pool of instant win lottery outcomes one of the lottery outcomes as a selected outcome and associating the activation code with the selected outcome;

the lottery control system operating to display to the customer on said digital experience said selected outcome as a digital experience game mechanic;

wherein the display of the selected outcome on the digital experience game mechanic is provided by the lottery control system independent of any game symbols provided on the lottery card;

wherein the lottery control system provides only, with the digital experience game mechanic and thus not on the lottery card, a validation code which is arranged to be stored on the internet communication device of the customer; and wherein the validation of the prize determined by the selected outcome is carried out by displaying the validation code from the digital experience game mechanic on the internet communication device to a lottery terminal.

2. The apparatus according to claim 1 [1] wherein the access code is arranged to be manually entered.

3. The apparatus according to claim 1 wherein the access code is appended to a URL provided in a QR Code image.

4. The apparatus according to claim 1 wherein the lottery control system is arranged such that the lottery cards are entered into inventory for payment by a retailer to the lottery only when the activation code is activated via a purchase.

5. The apparatus according to claim 1 wherein the lottery control system is arranged such that the lottery tickets are entered into inventory for payment by a retailer to the lottery when the lottery ticket is supplied to the retailer.

6. The apparatus according to claim 1 wherein the lottery control system is arranged to display on the digital experience a second-chance draw or game after display of said result as to whether the lottery card is either a winner of a predetermined prize or a non-winner of the lottery.

7. The apparatus according to claim 1 wherein the lottery control system comprises a single networked computer.

8. The apparatus according to claim 1 wherein the lottery control system comprises a series of interconnected computers having access to the communications network via a networking system.

9. The apparatus according to claim 1 wherein the lottery control system comprises a first lottery control component managed by the lottery and a second lottery control component managed by a supplier of the lottery tickets and the lottery cards.

10. The apparatus according to claim 1 wherein the lottery control system operates to assign the game outcome to the lottery cards in the following way:
   the POS system transmits the activation code and retailer data payload to the lottery control system;
   the activation code is scrubbed through a number of security measures by the lottery control system to ensure it is valid;
   a predetermined outcome in the form of a validation code from the reserved pool is assigned to the transmitted activation code by the lottery control system;
   the lottery control System returns the validation code to the POS System;
   the POS system transmits the validation code returned to the lottery control system to be made active for redemption;
   the lottery control system returns a response to the POS System confirming successful activation of that validation code.

11. A method for managing a lottery distribution of lottery funds to customers in a lottery comprising:
   providing a lottery control system comprising at least one programmed computer;
   providing a plurality of lottery cards each comprising a substrate and each having printed thereon:
      a Point of Sale (POS) code by which the lottery card is scanned through a POS system for purchase of the lottery card by a customer of the customers;
      a unique activation code which is scanned for entry of data identifying the lottery card into the lottery control system;
      and an access code which is used for entry by the customer into a digital experience provided by the lottery control system on a communication platform accessible by an internet communication device operated by the customer;
   providing in the lottery control system a predetermined pool of instant win lottery outcomes containing both winners of a predetermined prize and non-winners of the lottery;
   the lottery control system being arranged to receive the unique activation code of a lottery card when transmitted from a POS terminal to the lottery control system after reading of the POS code and the activation code of the lottery card by the POS terminal and after completing a purchase transaction of the lottery card using the POS code at the POS terminal;
   the lottery control system and the lottery cards being arranged such that, prior to receipt of the activation code from a lottery card by the lottery control system, the lottery card is not associated in the lottery control system with any of the outcomes in the pool of outcomes;
   in response to the receipt of the activation code by the lottery control system, selecting from the predetermined pool of instant win lottery outcomes one of the lottery outcomes as a selected outcome and associating the activation code with the selected outcome;
   the lottery control system operating to display to the customer on said digital experience said selected outcome as a digital experience game mechanic;
   wherein the lottery control system is arranged such that the displayed information on the digital experience comprises the predetermined game outcome and a reveal/skip button which allows the customer to determine the information without participating in the game mechanic;
   and wherein the lottery control system provides only with the digital experience game mechanic and thus not on the lottery card, a validation code which is arranged to be stored on the internet communication device of the customer; and wherein the validation of the prize determined by the selected outcome is carried out by displaying the validation code from the digital experience game mechanic on the internet communication device to a lottery terminal.

12. The apparatus according to claim 11 wherein the access code is arranged to be manually entered.

13. The apparatus according to claim 11 wherein the access code is appended to a URL provided in a QR Code image.

14. The apparatus according to claim 11 wherein the lottery control system is arranged such that the lottery cards are entered into inventory for payment by a retailer to the lottery only when the activation code is activated via a purchase.

15. The apparatus according to claim 11 wherein the lottery control system is arranged such that the lottery tickets are entered into inventory for payment by a retailer to the lottery when the lottery ticket is supplied to the retailer.

16. The apparatus according to claim 11 wherein the lottery control system operates to assign the game outcome to the lottery cards in the following way:
   the POS system transmits the activation code and retailer data payload to the lottery control system;
   the activation code is scrubbed through a number of security measures by the lottery control system to ensure it is valid;
   a predetermined outcome in the form of a validation code from the reserved pool is assigned to the transmitted activation code by the lottery control system;
   the lottery control System returns the validation code to the POS System;

the POS system transmits the validation code returned to the lottery control system to be made active for redemption;

the lottery control system returns a response to the POS System confirming successful activation of that validation code.

17. A method for managing a lottery distribution of lottery funds to customers in a lottery comprising:

provided a lottery control system comprising at least one programmed computer;

providing a plurality of lottery cards each comprising a substrate and each having printed thereon:

a Point of Sale (POS) code by which the lottery card is scanned through a POS system for purchase of the lottery card by a customer of the customers;

a unique activation code which is scanned for entry of data identifying the lottery card into the lottery control system;

and an access code which is used for entry by the customer into a digital experience provided by the lottery control system on a communication platform accessible by an internet communication device operated by the customer;

providing in the lottery control system a predetermined pool of instant win lottery outcomes containing both winners of a predetermined prize and non-winners of the lottery;

the lottery control system being arranged to receive the unique activation code of a lottery card when transmitted from a POS terminal to the lottery control system after reading of the POS code and the activation code of the lottery card by the POS terminal and after completing a purchase transaction of the lottery card using the POS code at the POS terminal;

the lottery control system and the lottery cards being arranged such that, prior to receipt of the activation code from a lottery card by the lottery control system, the lottery card is not associated in the lottery control system with any of the outcomes in the pool of outcomes;

in response to the receipt of the activation code by the lottery control system, selecting from the predetermined pool of instant win lottery outcomes one of the lottery outcomes as a selected outcome and associating the activation code with the selected outcome;

the lottery control system operating to display to the customer on said digital experience said selected outcome as a digital experience game mechanic;

wherein the lottery control system is arranged to display on the digital experience game mechanic unconnected to the lottery for fun play only in response to the access code when the activation code has not been scanned.

18. The method according to claim 17 wherein the lottery control system provides only with the digital experience game mechanic and thus not on the lottery card, a validation code which is arranged to be stored on the internet communication device of the customer; and wherein the validation of the prize determined by the selected outcome is carried out by displaying the validation code from the digital experience game mechanic on the internet communication device to a lottery terminal.

* * * * *